United States Patent [19]

Cooper et al.

[11] Patent Number: 4,475,184

[45] Date of Patent: Oct. 2, 1984

[54] VIBRATION LIMITING APPARATUS

[76] Inventors: Lloyd G. B. Cooper, 3042 Salisbury Rd.; Michael E. Baker, 4456 Fredericksburg Dr., both of Birmingham, Ala. 35213

[21] Appl. No.: 523,901

[22] Filed: Aug. 16, 1983

Related U.S. Application Data

[63] Continuation of Ser. No. 295,211, Aug. 21, 1981, abandoned.

[51] Int. Cl.³ ........................ F16M 13/00; G11B 1/00
[52] U.S. Cl. .................................. 369/263; 248/560; 248/631; 248/637; 248/669; 369/244
[58] Field of Search ............... 248/631, 186, 560, 637, 248/669; 369/244, 263, 249, 255, 270, 271

[56] References Cited

U.S. PATENT DOCUMENTS

| | | | |
|---|---|---|---|
| 3,101,952 | 8/1963 | Godfrey et al. | 369/249 |
| 3,235,267 | 2/1966 | Rangabe | 369/224 |
| 3,591,122 | 7/1971 | Mchaffie | 248/560 |
| 3,674,278 | 7/1972 | Bowerman | 369/263 |
| 3,940,098 | 2/1976 | Takasaki | 248/560 |
| 4,106,776 | 8/1978 | Gillespie | 369/263 |
| 4,325,133 | 4/1982 | Reitmayer | 369/263 |

FOREIGN PATENT DOCUMENTS 1399525  7/1975  United Kingdom ................ 369/263

Primary Examiner—Steven L. Stephan
Attorney, Agent, or Firm—Griffin, Branigan & Butler

[57] ABSTRACT

Vibration limiting apparatus for use in supporting devices sensitive to vibration embodies an outer supporting container. A vibration dampening liquid within the outer container dampens vibrations transmitted between the outer container and an inner buoyant member. The inner buoyant member supports the vibration sensitive device and floats freely within the outer container. Oppositely disposed magnets mounted on adjacent surfaces of the inner buoyant member and the outer supporting container urge the inner buoyant member toward a position so that it is supported by the dampening liquid in spaced relation to the adjacent inner surfaces of the outer container.

3 Claims, 4 Drawing Figures

VIBRATION LIMITING APPARATUS

This is a continuation of application Ser. No. 06/295,211, filed Aug. 21, 1981, now abandoned.

BACKGROUND OF THE INVENTION

This invention relates to vibration limiting apparatus and more particularly to such apparatus which is adapted for use with devices sensitive to vibration, such as conventional turntables for sound reproducing systems.

Heretofore in the art to which our invention relates, various devices have been devised for absorbing and dampening vibrations transmitted to and from devices sensitive to vibration. Such devices with which we are familiar are disclosed in the following U.S. Pat. Nos.: 4,079,943; 3,836,155; 3,368,807; 3,028,161; and 2,144,566. Some of these patents disclose various devices used in the suspension and balancing systems associated with conventional stereo and phonograph tone arms. Also, U.S. Pat. No. 2,144,566 discloses a spring mounted device for absorbing and dampening vibrations transmitted to the turntable. With this type device, compression springs are interposed between the turntable and a supporting member. Only limited success has been achieved with such spring dampening devices when used with vibration sensitive equipment due to the fact that they do not dampen vibrations to the levels required for proper operation of such equipment.

SUMMARY OF THE INVENTION

In accordance with our invention, we overcome the above and other difficulties by providing improved vibration limiting apparatus which is simple of construction and economical of manufacture. Our improved apparatus is adapted to be quickly and easily assembled with a minimum of effort by an unskilled person.

It is an object of our invention to provide vibration limiting apparatus which is adapted to support a device which is sensitive to vibration, such as the turntable of a phonograph, with such device floating freely within a dampening liquid whereby vibrations from external sources will not be transmitted to the turntable.

Our improved vibration limiting apparatus comprises a flluid-tight, upwardly opening outer supporting container which is adapted to be supported on a supporting surface. An inner buoyant member is adapted to support the device which is sensitive to vibration and float freely within the outer supporting container. A vibration dampening liquid provided in the outer supporting container supports the inner buoyant member and dampens any vibrations transmitted thereto from the outer container. Oppositely disposed magnets mounted on adjacent surfaces of the inner buoyant member and the outer supporting container urge the inner buoyant member toward a predetermined position in spaced relation to the inner surfaces of the outer supporting container.

BRIEF DESCRIPTION OF THE DRAWING

Apparatus embodying features of our invention is illustrated in the accompanying drawing, forming a part of this application, in which.

DETAILED DESCRIPTION

Figure 1:
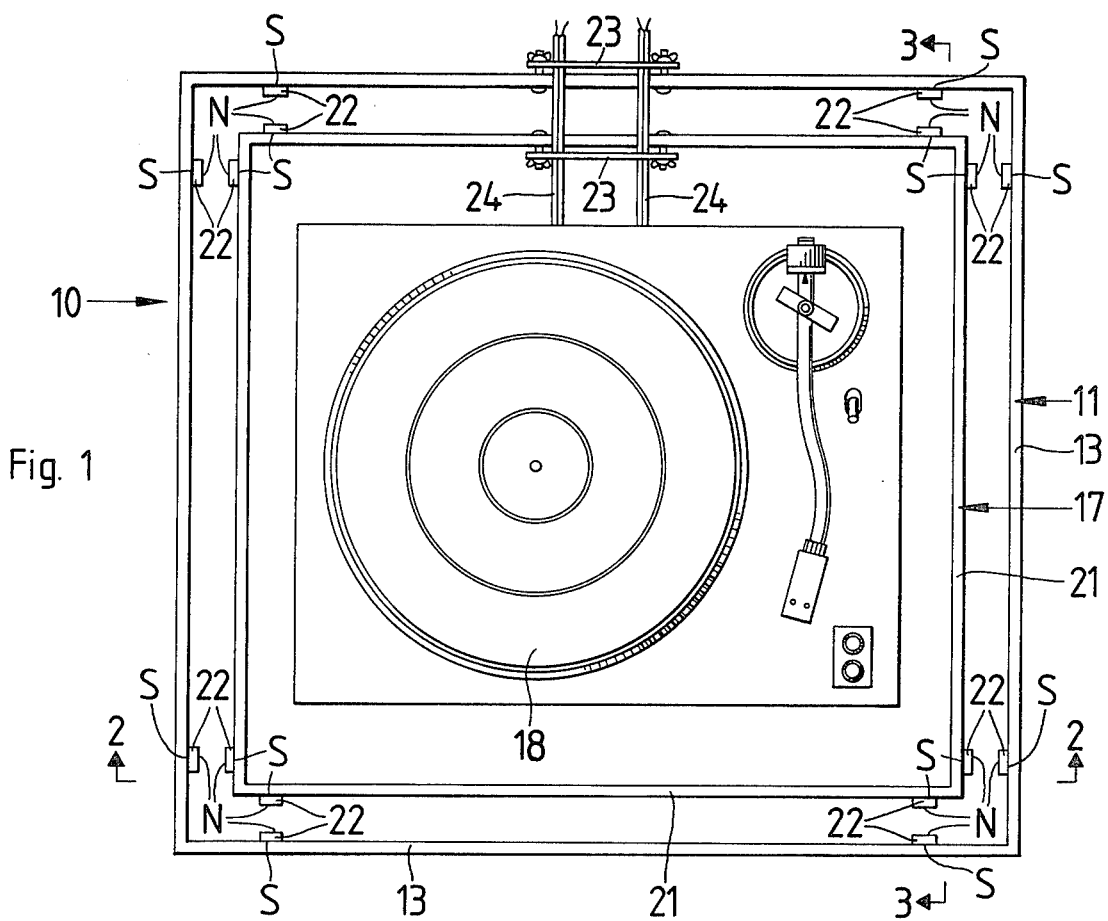
FIG. 1 is a top plan view of my improved vibration limiting apparatus.
Figure 2:
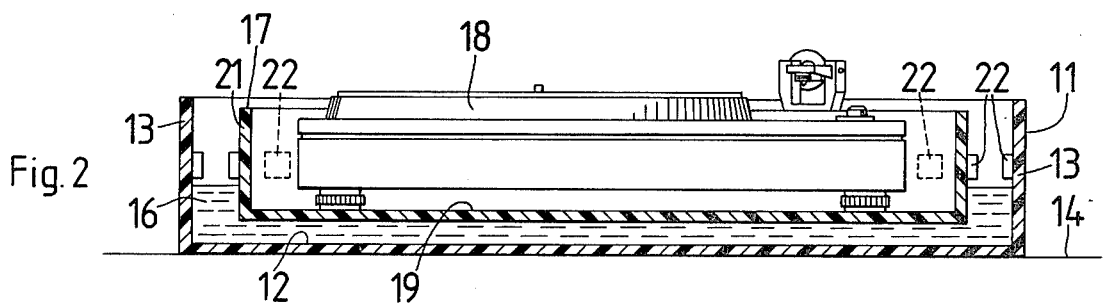
FIG. 2 is a sectional view taken generally along the line 2—2 of FIG. 1.
Figure 3:
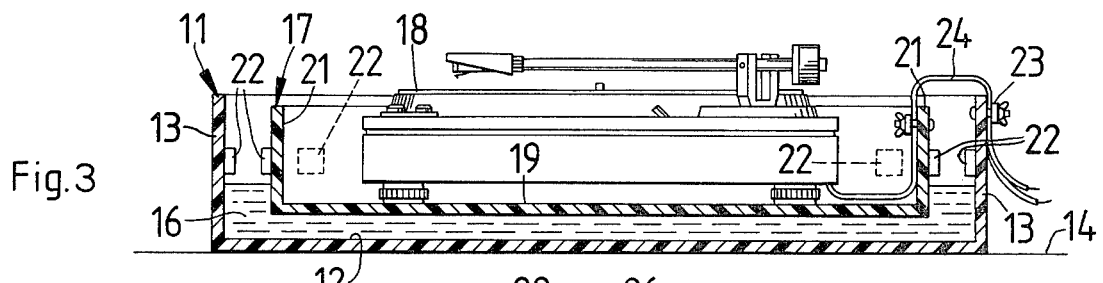
FIG. 3 is a sectional view taken generally along the line 3—3 of FIG. 1.

Referring now to the drawings for a better understanding of our invention, we show in FIG. 1 our improved vibration limiting apparatus indicated generally at 10. The apparatus is shown as including an upwardly opening outer supporting container 11, which may be in the form of a rectangular tray-like member having a bottom 12 connected to upstanding, spaced apart sidewalls 13. The outer container 11 is supported on a supporting surface 14, as shown in FIGS. 2 and 3. The outer container 11 is also adapted to receive a predetermined volume of a vibration dampening liquid which may be in the form of a suitable liquid 16, such as water. The dampening liquid must be of a suitable viscosity and density to support and dampen vibrations transmitted from the outer container 11 to the inner buoyant member 17. The buoyant member 17 is adapted to support a device which is sensitive to vibrations, such as the turntable 18 of a conventional phonograph system. The buoyant member 17 may also be in the form of a tray-like member having a bottom 19 connected to spaced apart, upstanding side walls 21. Since the inner buoyant member 17 is smaller than the outer supporting container 11, it will float freely on the liquid 16, as shown. The volume of the liquid 16 provided in the supporting container 11 to float the inner buoyant member 17 properly will vary directly with the combined weight of the buoyant member 17 and the turntable 18. That is, as their combined weight increases, the volume of liquid 16 provided in the outer supporting container 11 must be increased to float the buoyant member 17 above the bottom 12.

As shown in the drawing, a plurality of pairs of magnets 22 having like poles adjacent each other are mounted on the upstanding side walls 13 and 21 of the outer container 11 and the buoyant member 17, respectively. In particular, the embodiment of the invention shown in the drawings has a first magnet of at least one magnet pair mounted on inwardly facing portions of each of the four sidewalls 13 of outer supporting container 11. A second magnet of each magnet pair is mounted on a corresponding outwardly-facing portion of sidewall 21 of the inner buoyant member 17, so that each of the four sidewalls 21 have a second magnet of at least one magnet pair mounted thereon. Since the magnetic forces of each pair of magnets 22 oppose and repel each other, the inner buoyant member 17 is urged toward a position within the outer supporting container 11 in spaced relation to the upstanding side walls 13 of the outer supporting container 11. In this regard, FIG. 1 illustrates that each pair of magnets is positioned with respect to the remaining pairs of magnets so that inner buoyant member 17 is urged inwardly both with respect to a first dimension (the dimension along the line 2—2 of FIG. 1) and a second dimension which is orthogonal to the first dimension (the second dimension being along the line 3—3 of FIG. 1) to a predetermined position in spaced relation to the inner surface of the outer supporting container 11. While we have shown the magnets 22 as being mounted at adjacent corners of the side walls 13 and 21 and at an elevation above the liquid 16, it will be apparent that they may be mounted at other locations and below the liquid 16.

As shown in FIG. 3, suitable clamp members 23 detachably connect the usual electrical lead wires 24 for the turntable 18 to the upstanding side walls 13 and 21. The lengths of the electrical leads 24 between the side walls 13 and 21 is greater than the distance between the side walls 13 and 21 so that the inner buoyant member 17 is permitted to float freely within the liquid 16. Also, the electrical leads 24 should be positively connected to the side walls by the clamp members 23 so that the length of the leads 24 between the side walls 13 and 21 remains constant. The ratio between the length of the electrical leads 24 between the clamp members 23 and the section modulus of the wire conductors should be of a sufficient magnitude to make the bending stresses within the wires sufficiently low so as to prevent any measurable vibrations being transmitted through the electrical leads 24.

Figure 4:
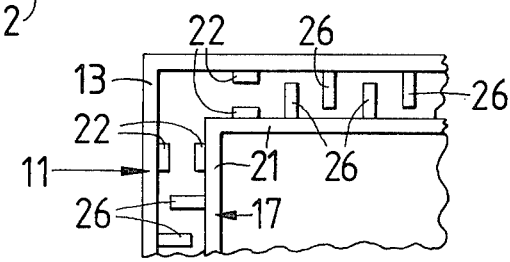
FIG. 4 is a fragmental top plan view corresponding to FIG. 1 showing a plurality of baffles carried by adjacent surfaces of the inner buoyant member and the outer supporting container.

Referring now to FIG. 4, we show a modified form of our invention in which a plurality of spaced apart, upstanding baffles 26 may be carried by adjacent surfaces of the outer container 11 and the inner buoyant member 17 in intercostal relation to each other. The baffles 26 are positioned relative to each other in a manner which disrupts wave formations within the dampening liquid 16 and thereby further eliminates vibration transfer to the buoyant member 17.

From the foregoing description, the operation of our improved vibration limiting apparatus will be readily understood. The outer supporting container 11 is placed on a supporting surface 14 and a predetermined volume of the liquid 16 is placed therein. The inner buoyant member 17 is placed within the outer supporting container 11 so that it floats freely in the liquid 16. The turntable 18 is then placed on the inner buoyant member 17. The oppositely disposed magnets 22 having like poles adjacent each other urge the inner buoyant member toward a position in spaced relation to the inner surface of the outer supporting container as shown in FIG. 1. Each pair of magnets is so positioned with respect to the remaining pairs of magnets that inner buoyant member 17 is urged inwardly with respect to two dimensions to maintain the inner buoyant member 17 in a predetermined position in spaced relation to the inner surfaces of the outer supporting member 11. After the electrical leads 24 are adjusted to the proper length permitting the inner buoyant member 17 to float freely in the liquid 16, they are positively connected to the side walls 13 and 21 by the clamp members 23, as shown in FIG. 3. During operation of the turntable 18, vibrations from external sources transmitted to the outer supporting container 11 are dampened by the liquid 16. Also, vibrations created within the device carried by the inner member 17 will be dampened by the liquid 16.

From the foregoing, it will be seen that we have devised improved vibration limiting apparatus which is particularly adapted for use with stereo and phonograph turntables and the like. The apparatus is also very simple of construction and economical of manufacture. Also, our improved apparatus is adapted to be quickly and easily assembled with a minimum of effort by unskilled labor. Furthermore, our improved apparatus provides a floating support for the turntable whereby it floats freely in the vibration dampening liquid.

While we have shown our invention in two forms, it will be obvious to those skilled in the art that it is not so limited, but is susceptible of various other changes and modifications without departing from the spirit thereof.

What we claim is:

1. Vibration limiting apparatus for use in supporting devices which are sensitive to vibration comprising:
   (a) a fluid-tight, upwardly opening outer supporting container comprising at least four upstanding sidewalls,
   (b) a vibration dampening liquid within said outer supporting container,
   (c) an inner buoyant member within said outer supporting container, said inner buoyant member comprising at least four sidewalls, each of the sidewalls of said inner buoyant member facing a corresponding sidewall of said outer supporting container, said inner buoyant member being adapted to support said device and float freely within said outer supporting container with said liquid having sufficient density and viscosity to support said inner buoyant member in spaced relation to the inner surface of said outer supporting container to dampen vibrations between said outer supporting container and said inner buoyant member, and
   (d) a plurality of pairs of oppositely disposed magnets, at least four of said outer supporting container sidewalls having a first magnet of at least one of said magnet pairs mounted thereon and at least four of said corresponding inner buoyant member sidewalls having a second magnet of at least one of said magnet pairs mounted thereon, like poles of each of said pairs of magnets being adjacent each other, each pair of magnets having a location with respect to the remaining pairs of magnets whereby said inner buoyant member is urged inwardly both with respect to a first dimension and with respect to a second dimension orthogonal to said first dimension to maintain said inner buoyant member in a predetermined position in spaced relation to the inner surface of said outer supporting container.

2. Vibration limiting apparatus as defined in claim 1 in which said inner buoyant member and said outer supporting container are tray-like members.

3. Vibration limiting device as defined in claim 1 in which a plurality of spaced apart, upstanding baffles are carried in intercostal relation on said sidewalls of said inner buoyant member and on said sidewalls of said outer supporting container to disrupt wave formations within said liquid dampening medium.

* * * * *